United States Patent [19]

Scott, Jr.

[11] 3,786,594
[45] Jan. 22, 1974

[54] METHOD OF RAISING AND HANDLING WASPS
[75] Inventor: Clarence A. Scott, Jr., Groom, Tex.
[73] Assignee: Beneficial Insect Control, Inc., Groom, Tex.
[22] Filed: Apr. 17, 1972
[21] Appl. No.: 244,932

[52] U.S. Cl................................. 43/124, 119/6
[51] Int. Cl............................................ A01m 5/00
[58] Field of Search............... 43/124, 132 R; 119/6

[56] References Cited
UNITED STATES PATENTS
3,463,122   8/1969   St. Julian............................... 119/6

OTHER PUBLICATIONS
U.S. Dept. of Agriculture, Insects Yearbook, 1952, 10/8/63, pp. 82, 83.
DeBach (ed.), Biological Control of Insect Pests and Weeds, 9/20/65, pp. 283–305.

Primary Examiner—Robert Peshock
Assistant Examiner—James H. Czerwonky
Attorney, Agent, or Firm—D. Carl Richards et al.

[57] ABSTRACT

Aphid infestation of crops such as alfalfa and milo is treated by first collecting aphid mummies, i.e., the dead carcasses of aphids within which eggs of the parasitic wasp, braconid lysiphlebus, have been laid. After the aphid mummies are collected, they are refrigerated and transported to the location of the infested fields to be treated. A plurality of mummies are then placed in a container open to the atmosphere in a field infested with aphids. Parasitic wasps hatch from eggs within the aphid mummies within a short period of time and leave the container. The wasps then attack and kill the live aphids infesting the crop by planting eggs in them which subsequently hatch into more wasps.

3 Claims, No Drawings 3,786,594

METHOD OF RAISING AND HANDLING WASPS

BACKGROUND OF THE INVENTION

1. Field of the Invention

The invention relates to a method for controlling aphid infestation in a crop, and more particularly, to a method for raising and handling wasps to control aphid infestation.

2. History of the Prior Art

In the cultivation of crops such as alfalfa, milo, peaches and others control of insect infestation, and particularly aphid infestation, is often determinative of the success or failure of the crop.

In the past, the principal method of controlling destructive insects, such as aphids, has been that of treating the infested crop with insecticides. One disadvantage to the use of insecticides is that they destroy, in addition to aphids, other, beneficial insects, such as lacewing flies (which destroy harmful insects, such as mites) and lady bugs (which themselves serve mainly to destroy aphids). An additional drawback to the use of insecticides is that over a period of time, insects often build up a tolerance to the poison so that they become progressively more difficult to destroy and treatment requires progressively larger quantities of insecticide. A further disadvantage to the use of insecticides is that treatment is relatively expensive in comparison to the techniques of the present invention.

Left to itself, the checks and balances of nature will serve to control aphid infestation of a crop in that as the aphid population increases, it is followed by the appearance and multiplication of the parasitic wasp, braconid lysiphlebus, which must have an aphid population present in order to reproduce. Unfortunately, however, the development of the parasitic wasp lags the development of aphids in a crop by a period of on the order of one to two months. If the wasps do not make their natural appearance early enough in the cycle of aphid development, the entire crop can be virtually destroyed before the wasp brings the aphid infestation under control.

The present method is used to accelerate the apperance of the parasitic wasp in an aphid-infested crop in order to destroy the aphids before they have had an opportunity to do irreparable damage to a crop.

SUMMARY OF THE INVENTION

A process for raising and handling parasitic wasps which includes locating a first crop which is infested with aphids and has been exposed to a parasitic wasp population for a sufficient time to produce a substantial number of aphid mummies on the plants of the crop. The aphid mummies are collected from the plants of the first crop and transported to a location remote from the first crop which is infested with aphids. A container of aphid mummies is placed near the remote location and within a second crop in the early stages of aphid infestation. The container is opened to the atmosphere so that parasitic wasps hatch from the aphid mummies and leave the container to destroy the aphid population infesting the second crop.

DETAILED DESCRIPTION OF THE INVENTION

The female of the parasitic wasp, braconid lysiphlebus, kills aphids by stinging them and simultaneously implanting an egg into the body of the aphid. The egg begins to grow and develop immediately and approximately seven days after implantation the aphid dies. When the aphid dies a resinous substance is secreted which attaches the carcass (called a mummy) to the leaf. Within approximately five more days after the aphid's death the fully developed wasp cuts a small hole in the upper rear section of the mummy and emerges full sized. The female wasps are soon fertilized and begin destroying aphids themselves by implanting eggs. As can be seen, the presence of aphids is essential to the parasitic wasp, braconid lysiphlebus, being able to complete its life cycle.

Each female parasitic wasp may implant from twenty to thirty eggs per day. Approximately 1,000 female wasps introduced per acre of crop will develop within a period of from twelve to fourteen days to on the order of 20,000 to 30,000 wasps per acre, as long as there is sufficient infestation of aphids to support that development.

The first step in the method of the present invention is that of locating a crop such as alfalfa, milo, turnips or wheat which is infested with aphids. The crop is preferably out of the range of insecticides and developed to the point that the parasitic wasp, braconid lysiphlebus, has concurrently developed naturally and begun to kill the aphids by implanting eggs within their bodies. When the crop and its wasp population have reached the point that the aphid population is approximately 80 percent mummies, the mummies are harvested. The mummies are separated from live aphids, by one of several techniques, described below, and the mummies are collected in containers.

The collected mummies are refrigerated at a temperature on the order of 40° F. which slows the development of the wasp eggs within the mummies. The refrigerated mummies are then transported from the point of collection to a distribution center and from there to points of aphid infestation which are to be controlled. Transportation may often be over a considerable distance, because crops located in a warm area will develop both aphid infestation and wasp counterinfestation several weeks prior to the same natural cyclic development in a cooler area. That is, the wasp mummies are introduced into an aphid-infested field several weeks earlier than they would be by natural development of the wasp.

At some point following collection approximately 10,000 aphid mummies are placed in each of several containers, such as insulating cups. The cups are covered with lids and a suspension means, such as a rubber band, is stapled to the side of the cup. The cups containing aphid mummies are taken out of refrigeration and placed in an aphid-infested field (approximately 1 cup per 5 acres) by hanging the rubber band over a leaf. The container is opened to the atmosphere by placing a hole in the side so that as the female wasps hatch from the mummies they can leave the cup and fly out into the aphid-infested field to be fertilized and begin destroying live aphids by implanting eggs.

The containers of wasp mummies are placed in the fields as soon as the development of aphids is noted, e.g. when aphids begin to appear in the swirls of milo. The timing is such that the wasps will have a chance to develop and build a population sufficiently large to take care of a heavy infestation of aphids at a later date. Once the wasps have destroyed virtually all the aphids in the field, they migrate to another location in search of more aphids.

EXAMPLE I

A plot of land was located and a crop was planted that would infest with an aphid family, such as milo, turnips or alfalfa. Once a heavy infestation of aphids had occurred, parasitic wasps, braconid lysiphlebus, were introduced into the field and began to attack the aphids. The wasps were spread as evenly as possible across the field. When the aphid population was approximately 80 percent mummies, the mummies were harvested by the use of air pressure. First a leaf supporting a plurality of live aphids and mummies was removed from the plant and a nozzle connected to a supply of pressurized air was used to blow the live aphids from the leaf. Enough air pressure was used to blast the live aphids from the leaves but not dislodge the mummies which were affixed more securely. After the live aphids were removed, the air pressure was increased to a point sufficient to dislodge the mummies and the mummies were blown off the leaves into a net. Approximately 10,000 mummies were placed in a styrofoam cup having a lid and a rubber band stapled to the side. A plurality of cups were placed in a container and refrigerated in order to lower the temperature thereof to a value on the order of 40° F. The cups were then transported to a distribution point while being maintained at the reduced temperature and then placed in the field.

About 1 cup of the mummies are used for each 5 acres of crop although the number used may vary according to aphid population in the crop. The cups were hung by their rubber bands over leaves of an infested milo crop and a hole opened in the side of each cup to expose the interior thereof to the atmosphere. Shortly after the cups were taken out of refrigeration and distributed, wasps began to hatch from the mummies and pass out through the opening in the cup into the field of milo. The female wasps were soon fertilized and began destroying aphids by stinging them and laying an egg therein. Within a few weeks the milo crop was virtually aphid-free with relatively little damage having been done to the crop.

EXAMPLE II

An alfalfa crop was located which was already infested with aphids and which had been infested for a sufficient period to bring about the concurrent development of the parasitic wasp, braconid lysiphlebus, and the production of many mummies. A lawn sweeper having rotating nylon brushes was passed through the alfalfa field to collect both live aphids and aphid mummies from the leaves of the alfalfa. The material collected by the lawn sweeper was then passed through a porous screen to remove the trash.

A mixture of live aphids and mummies was then passed down a rectangular chute, approximately 8 inches in width and having vertical sides approximately 4 inches in height. The chute was covered on the inside surface with wool flannel material and supported at an angle to the horizontal. The mummies, which were hard and slick, rolled down the inclined flannel surface to the bottom of the chute, while most of the live aphids, having legs and other protrusions, clung to the fibers on the surface of the flannel. After passing the mixture down the chute several times, virtually all the live aphids were eliminated and the aphid mummies were collected at the bottom. Occasionally, worms were found mixed in with the aphid mummies collected from the alfalfa and these were removed by laying a stick or other piece of vegetation on top of the mummies and, within a short period of time, the worms crawled upon the stick and were removed.

The collected mummies were then handled as in Example I by refrigerating the mummies to a temperature on the order of 40° F., transporting the mummies to a distribution location, and placing a plurality of the mummies in containers open to the atmosphere in an aphid-infested field. When the wasps began to hatch from the mummies, they dispersed into the field and began destroying the aphids.

Several modifications of the above techniques may be employed. Various means can be used for gathering and separating the mummies from live aphids. For example, air pressure can be used to remove live aphids and other unwanted insects from leaves and then the aphid mummies can be collected with a vacuum cleaner. Similarly, a conventional "seed cleaner" used to process seeds, such as milo, can be used to separate aphid mummies from live aphids and trash. Alternatively, a knife blade or similar object may be used to rake the mummies from the leaves into a collecting container. Further, leaves may be cut from infested plants, live aphids removed therefrom with air pressure and the leaves themselves refrigerated and later placed in a field to be treated for aphid infestation.

As can be seen, the present method of raising and handling wasps results in highly efficient control of aphid infestation in crops at a time sufficiently early to avoid destruction of the crop by the aphids. Further, the present technique eliminates the use of insecticides and the attendant problems and is considerably cheaper, costing on the order of one-half to one-tenth the cost of treating a crop with insecticides.

Having described the invention in connection with certain specific embodiments thereof, it is to be understood that further modifications may now suggest themselves to those skilled in the art and it is intended to cover such modifications as fall within the scope of the appended claims.

What is claimed is:

1. A process for raising and handling parasitic wasps comprising the steps of:
    locating a first crop infested with aphids, the crop having been exposed to a "braconid Lysiphlebus" lysiphlebus parasitic wasp population for a sufficient time to produce a substantial number of aphid mummies on the plants of said crop;
    locating leaves supporting both live aphids and aphid mummies from said plants;
    separating the live aphids from aphid mummies on said leaves;
    collecting said aphid mummies;
    transporting the collected aphid mummies to a location remote from said first crop; and
    placing a plurality of said aphid mummies in a second crop in the early stages of aphid infestation at said remote location, so that braconid lysiphlebus parasitic wasps may hatch from the aphid mummies to destroy the aphid population infesting said second crop.

2. A method of raising and handling wasps as set forth in claim 1 where said separating step comprises:

subjecting an infested leaf of said first crop to a first blast of air pressure sufficient to remove the live aphids but not the aphid mummies; and subjecting the leaf supporting aphid mummies to a second blast of air pressure having more force than said first blast of air pressure to remove the aphid mummies from the leaf into a collecting container.

3. A method of raising and handling wasps as set forth in claim 1 wherein said separating step comprises:

supporting a rectangular chute, having the inside covered with a fibrous cloth, at an incline to the horizontal; and placing a mixture of live aphids and aphid mummies at the top of said chute to allow the aphid mummies to roll to the bottom and be segregated from the live aphids which cling to the fibers of the cloth.

* * * * *